United States Patent [19]

Huiskes et al.

[11] Patent Number: 5,041,758
[45] Date of Patent: Aug. 20, 1991

[54] LOW-PRESSURE MERCURY VAPOR DISCHARGE LAMP

[75] Inventors: Cornelis Huiskes, Roosendaal; Roelof Brinkman, Maarheeze, both of Netherlands

[73] Assignee: U.S. Philips Corporation, New York, N.Y.

[21] Appl. No.: 503,351

[22] Filed: Mar. 30, 1990

[30] Foreign Application Priority Data

Apr. 17, 1989 [NL] Netherlands ............... 8900950

[51] Int. Cl.$^5$ .............................................. H01J 1/62
[52] U.S. Cl. ....................................... 313/487; 313/489
[58] Field of Search ................... 313/486, 487, 489; 252/301.4 R

[56] References Cited

U.S. PATENT DOCUMENTS

| | | | |
|---|---|---|---|
| 4,208,448 | 6/1980 | Panaccione | 313/487 |
| 4,524,300 | 6/1985 | Rutten et al. | 313/487 |
| 4,705,986 | 11/1987 | Iwama et al. | 313/487 |

FOREIGN PATENT DOCUMENTS

| | | | |
|---|---|---|---|
| 0094132 | 10/1986 | European Pat. Off. | |
| 0241637 | 11/1985 | Japan | 313/487 |
| 0002444 | 1/1987 | Japan | 313/487 |

OTHER PUBLICATIONS

"Fluorescent Lamp Phosphers: Technology and Theory", by Keith H. Butler, The Pennsylvania State University Press, pp. 6–8, 12/1980.

*Primary Examiner*—Palmer C. DeMeo
*Assistant Examiner*—Nimeshkumar D. Patel

[57] ABSTRACT

Low-pressure mercury vapor discharge lamp in which the envelope (1) is provided on its inside with a luminescent layer (5), which comprises green luminescing $Zn_2SiO_4:Mn^{2+}$ (willemite), while between the luminescent layer (5) and the envelope (1) a luminescent intermediate layer (6) is present, which comprises luminescent $Sr_4Al_{14}O_{24}: Eu^{2+}$, in which the Sr may be replaced for up to 25 mol. % by Ca.

3 Claims, 1 Drawing Sheet

LOW-PRESSURE MERCURY VAPOR DISCHARGE LAMP

BACKGROUND OF THE INVENTION

The invention relates to a low-pressure mercury vapour discharge lamp having an envelope which is sealed in a vacuum-tight manner and transmits radiation, and which contains mercury and a rare gas, the envelope being provided on its inside with a luminescent layer comprising a green luminescing zinc orthosilicate activated with bivalent manganese, defined by the formula $Zn_2SiO_4:Mn^{2+}$.

A low-pressure mercury vapour discharge lamp of the type described above is known from the book by Keith H. Butler, "Fluorescent Lamp Phosphors", 1980, pp. 6 and 8.

Excitation of the manganese-activated zinc orthosilicate (willemite) with short-wave ultraviolet radiation from the mercury discharge, mainly 254 nm radiation, generates an emission in the green part of the spectrum.

Lamps emitting such a green light are used in practice mainly for achieving colour effects, for example in stage lighting, shop window lighting, festive illumination, etc.

The envelope, which is usually made of glass, may be designed in various shapes, for example as a straight tube, a U-shaped tube, or a torus-shaped tube. The envelope may also be designed as a bulb having an indentation as with an electrodeless lamp. Before the luminescent layer is applied, the envelope may have been coated over part of its interior circumference with a reflecting layer, so that the green radiation generated emanates through a window left open by the reflecting layer. If so desired, it is also possible to provide the tube on the inside with an absorptive layer which absorbs undesirable mercury lines in the blue and/or long-wave ultraviolet part of the spectrum.

A disadvantage of the known lamp is that during operation of the lamp the luminescent layer shows a strong greying. The greying effect during operation causes the lamp to look black when not operating, which is visually unattractive and in some lamp applications undesirable. Moreover, the greying effect causes a shift of the colour point of the emitted radiation and a reduction of the light output. It is assumed that the greying effect is caused by zinc ions of the luminescent willemite being reduced to metallic zinc during operating of the lamp. The metallic zinc can subsequently form an amalgam with the mercury from the discharge.

OBJECT AND SUMMARY OF THE INVENTION

The invention has for its object to provide an improved low-pressure mercury vapour discharge lamp in which a visually attractive, bright green appearance of the inoperative lamp remains intact throughout lamp life and in which the shift of the colour point of the emitted radiation and the light depreciation during lamp life are reduced.

According to the invention, a low-pressure mercury vapour discharge lamp of the type indicated in the opening paragraph, is characterized in that a luminescent intermediate layer is present on the inside of the envelope at the side of the luminescent layer remote from the discharge, the intermediate layer comprising a luminescent strontium aluminate activated by bivalent europium, of the formula $Sr_4Al_{14}O_{25}:Eu^{2+}$, in which the Sr may be replaced by Ca up to 25 mol. %.

Luminescent aluminates defined by the formula $Sr_4Al_{14}O_{25}:Eu^{2+}$, with an Eu content between 0.1 and 10 mol. % with respect to the Sr, in which Sr may be replaced by Ca up to 25 mol. %, are known per se from European Patent 0 094 132 (PHN 10.347). These aluminates are crystalline compounds having a characteristic X-ray powder diagram, which is shown in the European Patent referred to. Although these aluminates can be obtained starting from Sr/Al ratios between 1:2 and 1:5, it is assumed that the crystalline phase substantially has the composition $Sr_4Al_{14}O_{25}$.

The efficiently luminescing aluminates as defined by the formula $Sr_4Al_{14}O_{25}:EU^{2+}$ are stable compounds, of which the colour is green. By using them in an intermediate layer between the lamp envelope and the layer comprising willemite, the stable green intermediate layer screens the willemite layer not only physically but also optically from the outer world while the lamp is not operating. Thus, the lamp throughout its entire life retains an attractive bright green appearance in the non-operating condition.

During lamp operation the luminescent willemite layer provides the usual green emission, while the luminescent aluminate intermediate layer produces a blueish green emission band with an emission maximum at approximately 490 nm and a half-value width of approximately 60 nm. By suitably choosing the ratio of the quantities of the two luminescent materials in the known manner, the required colour point of the green emission is obtained.

Since the willemite in the combination with the stable aluminate now is only a part of the total quantity of luminescent material, the influence of the greying of the willemite on the emission process is smaller, so that the colour-point shift of the emitted radiation and the light depreciation during lamp life are reduced.

In a preferred embodiment of the low-pressure mercury vapour discharge lamp according to the invention, the luminescent intermediate layer is directly applied on the interior wall of the envelope. This favourably affects the cost of the lamp, since no reflecting or absorbing layer is used.

In a further preferred embodiment of the low-pressure mercury vapour discharge lamp according to the invention, the luminescent layer is directly applied on the luminescent intermediate layer. This is also favourable for the cost of the lamp.

BRIEF DESCRIPTION OF THE DRAWINGS

An embodiment of the lamp according to the invention will now be described in greater detail with reference to the accompanying drawing.

In the drawing.

DESCRIPTION OF THE PREFERRED EMBODIMENT

Figure 1:
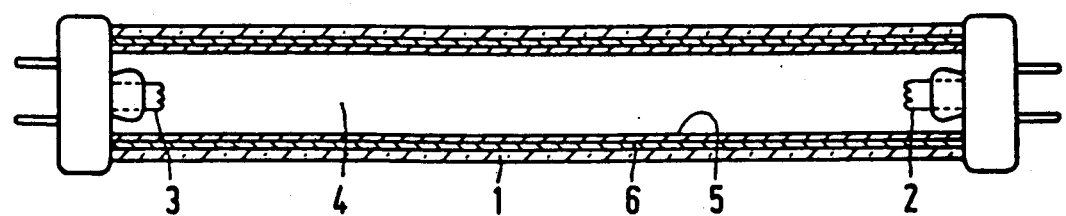
FIG. 1 shows a low-pressure mercury vapour discharge lamp in a longitudinal cross-section, the lamp being provided with a luminescent layer and a luminescent intermediate layer.

The low-pressure mercury vapour discharge lamp according to FIG. 1 has a tubular glass envelope 1, which is sealed in a vacuum-tight manner, and transmits radiation, and which contains mercury and a rare gas as a starting gas. Within the lamp, at its extremities, electrodes 2 and 3 are positioned, between which extends a discharge path 4. The envelope 1 is provided on its inside with a luminescent layer 5, which comprises a green luminescing zinc orthosilicate activated with bivalent manganese, defined by the formula $Zn_2SiO_4:Mn^{2+}$ (willemite), and which faces the discharge path 4. On the side of the luminescent layer 5 remote from the discharge path 4, between this layer 5 and the envelope 1, a luminescent intermediate layer 6 is present, which comprises a luminescent strontium aluminate activated by bivalent europium, defined by the formula $Sr_4Al_{14}O_{25}:Eu^{2+}$, in which the Sr may be replaced by up to 25 mol. % Ca. The intermediate layer 6 is directly applied on the interior wall of the envelope 1, and the layer 5 is directly applied on the intermediate layer 6. The layers can be applied in the usual manner, for example by means of a suspension containing the luminescent material. The stable intermediate layer 6 has a green colour, so that the lamp in its non-operative condition has a green appearance. This green appearance of the non-operative lamp remains intact throughout lamp life in spite of the greying of the willemite layer 5 during lamp operation. This is because the willemite layer 5 remains optically screened from the outer world by the green intermediate layer 6 when the lamp is not operating. Owing to the presence of two luminescent layers, the willemite layer 5 supplies only part of the total quantity of radiation emitted by the lamp under the influence of the mainly 254 nm excitation radiation (mercury resonance line). Compared with the known lamp with exclusively a luminescent willemite layer, the influence of the greying effect of the willemite is smaller, therefore, there will be a smaller shift of the colour point of the emitted radiation and a smaller light depreciation during lamp life.

Figure 2:
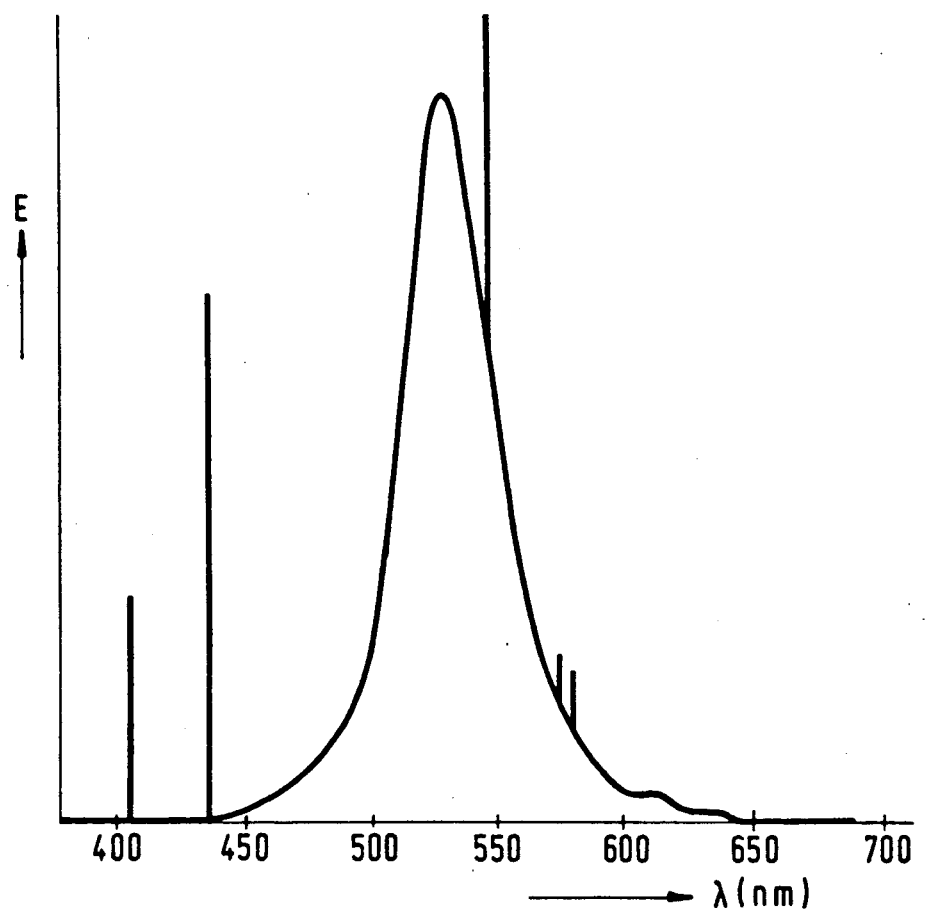
FIG. 2 shows the emission spectrum of a low-pressure mercury vapour discharge lamp according to the invention.

In a practical embodiment, the low-pressure mercury vapour discharge lamp has a length of approximately 120 cm, an internal tube diameter of approximately 24 mm and a power rating of approximately 36 W, the intermediate layer 6 consists of 2 g of $Sr_{3.9}Eu_{0.1}Al_{14}O_{25}$, while the layer 5 consists of 2 g of $Zn_{1.89}Mn_{0.11}SiO_4$. The initial luminous efficacy of the lamp was 105 lm/W. After 100 burning hours the luminous flux had decreased by 2.9%. The colour point of the green radiation emitted by the lamp had initially the coordinates $x=0.235$ and $y=0.617$, and after 100 burning hours the coordinates $x=0.236$ and $y=0.617$. The emission spectrum of this lamp is shown in FIG. 2. The wavelength $\lambda$ has been plotted on the horizontal axis in nm, and the emitted radiation energy E on the vertical axis in arbitrary units. As can be seen, the radiation is emitted mainly in the green region of the spectrum (500–565 nm). The lines on the left in the graph represent the mercury lines of 405 and 436 nm respectively.

We claim:

1. A low-pressure mercury vapour discharge lamp having an envelope which is sealed in a vacuum-tight manner and transmits radiation, and which contains mercury and a rare gas, said envelope being provided on its inside with a luminescent layer comprising a green luminescing zinc orthosilicate activated by bivalent manganese, defined by the formula $Zn_2SiO_4:Mn^{2+}$, characterized in that a luminescent intermediate layer is present on the inside of the envelope at the side of the luminescent layer remote from the discharge, said intermediate layer comprising a luminescent strontium aluminate activated by bivalent europium, defined by the formula $Sr_4Al_{14}O_{25}:Eu^{2+}$, in which the Sr may be replaced up to 25 mol. % by Ca.

2. A low-pressure mercury vapour discharge lamp as claimed in claim 1, characterized in that the luminescent intermediate layer is directly applied on the interior wall of the envelope.

3. A low-pressure mercury vapour discharge lamp as claimed in claim 1 or 2, characterized in that the luminescent layer is directly applied on the luminescent intermediate layer.

* * * * *